United States Patent [19]

Harbeke

[11] Patent Number: 4,671,483

[45] Date of Patent: Jun. 9, 1987

[54] CONCRETE-FORM CONDUIT HOLDER

[76] Inventor: Gerold J. Harbeke, 2807 S. Military Trail, West Palm Beach, Fla. 33415

[21] Appl. No.: 802,278

[22] Filed: Nov. 27, 1985

[51] Int. Cl.⁴ .............................................. E04G 21/18
[52] U.S. Cl. ..................................... 249/91; 248/68.1; 249/177; 249/219 R; 269/43; 269/904
[58] Field of Search ....................... 249/39, 83, 91, 93, 249/176, 177, 219 R; 248/49, 68.1; 52/220, 221, 698, 699; 269/43, 45, 904

[56] References Cited

U.S. PATENT DOCUMENTS

| | | | |
|---|---|---|---|
| 2,889,602 | 6/1959 | Maniaci | 248/68.1 |
| 3,160,175 | 12/1964 | Laemmle | 248/68.1 |
| 3,163,909 | 1/1965 | Williams | 269/904 |
| 3,420,275 | 1/1969 | Glen et al. | 249/219 R |
| 3,526,934 | 9/1970 | Owen, Sr. | 248/68.1 |
| 4,061,322 | 12/1977 | LeBlanc | 269/904 |

Primary Examiner—Jay H. Woo
Assistant Examiner—James C. Housel
Attorney, Agent, or Firm—Griffin, Branigan & Butler

[57] ABSTRACT

A concrete-form conduit holder (10) comprises upright supports (14 and 16) attached to a floor wall (28) of a concrete-form and extending upwardly therefrom. A laterally extending header bar extending between the upright supports forms a substantially horizontal surface on the bottom side thereof to which a plurality of cups are attached with open ends thereof facing downwardly and closed ends thereof facing upwardly against the header bar. To use the concrete-form conduit holder, the upright supports are attached to the floor wall and tubular conduits are extended from outside the form into the form with their ends inserted upwardly into the open ends of said cups where they are held by screws.

9 Claims, 6 Drawing Figures

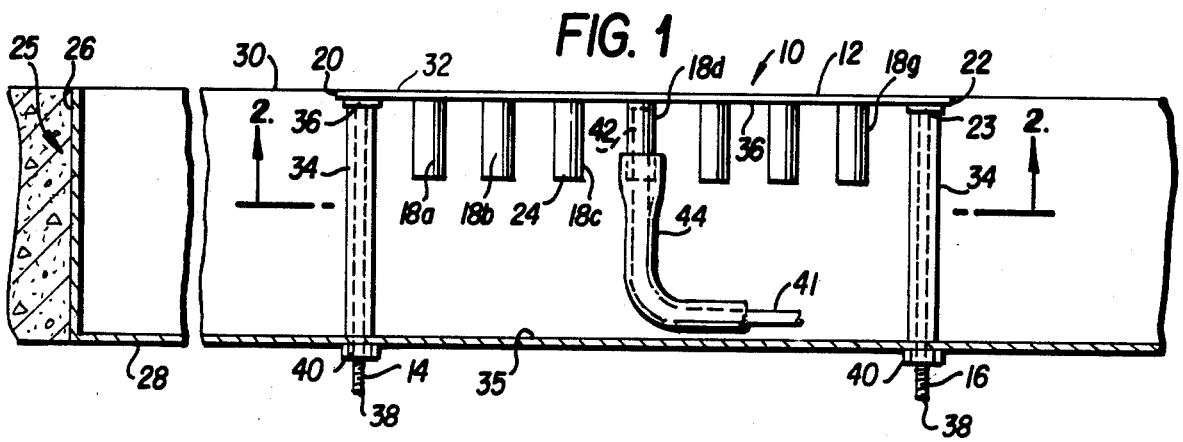
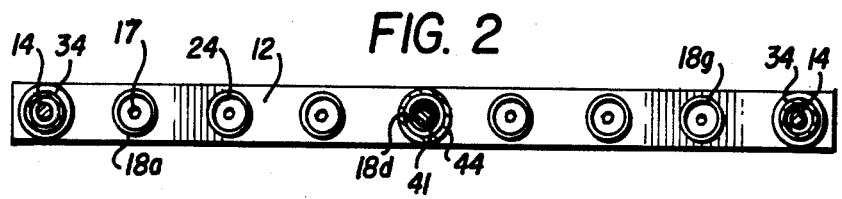
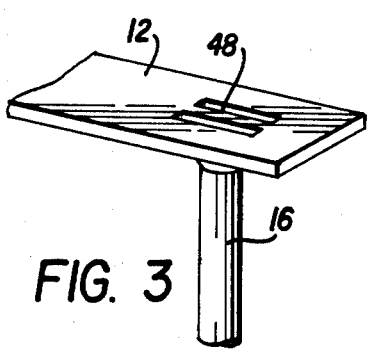
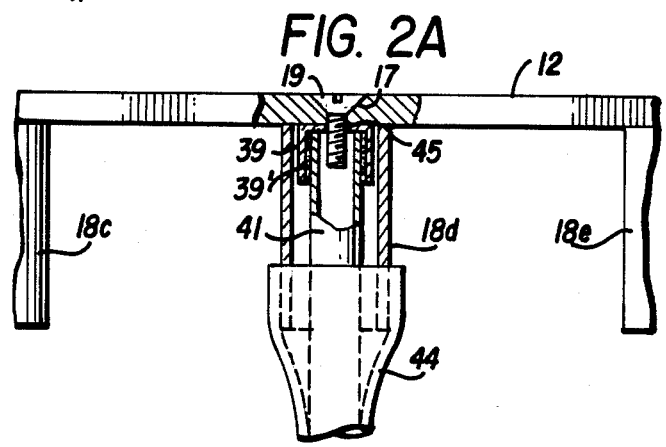
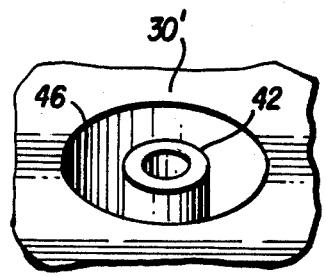
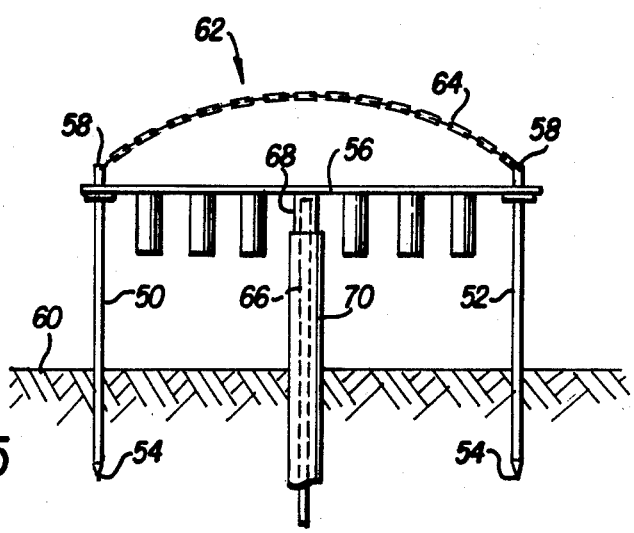

CONCRETE-FORM CONDUIT HOLDER

BACKGROUND OF THE INVENTION

This invention relates broadly to the art of concrete-forms and more specifically to devices for holding utility conduits in proper positions within said forms while concrete is being poured.

When pouring concrete floors it is often desirable to have tubular conduits therein, such as copper pipes and the like which can be, after the concrete dries, hooked up to lines inside a building. In the past, such conduits have often been layed in floor forms with ends thereof extending upwardly above the upper surfaces of the floors so that one has had access to the ends for coupling thereto once the concrete hardens. A difficulty with this method is that as the concrete hardens workmen use mechanized tools for processing the upper surface of the concrete and such conduits and the like extending above the surface interfere with these machines. Therefore it is an object of the invention to provide a conduit holder for holding conduits in concrete forms during the pouring of the concrete which does not allow conduits to extend above the surface of the concrete but yet which allows workers to get to the ends of the tubular conduits for coupling thereto once the concrete has hardened.

It is also an object of this invention to provide such a tubular conduit holder which can be easily attached to any form. Still another object of this invention is to provide such a tubular conduit holder which is not unduly complicated to use.

Another object of this invention is to provide a conduit holder that can be easily removed from the conduits and the concrete and which leaves the ends of the conduits free from concrete without requiring a worker to break up a frangible spacer surrounding the conduit ends.

Yet another object of this invention is to provide a tubular conduit holder which holds many tubular conduits but yet which requires only one or two supports mounted on a form.

It is yet a further object of this invention to provide a tubular conduit holder for concrete forms which is economical in that it can be recovered and reused and in that it is uncomplicated in design and can be economically constructed.

SUMMARY OF THE INVENTION

According to principles of this invention, a support is attached to a wall of a form at an attachment zone and extends from the attachment zone into the form. The support includes a laterally extending header bar which has at least one barrel-shaped cup with an open end pointing downwardly and a closed end being fastened to the header bar. In a preferred embodiment, the support includes two uprights for attaching to a bottom wall of a form and a header bar extending between these two uprights. A plurality of cups with open ends pointing downwardly are attached on a bottom surface of the header bar. In use, tubular conduits are extended from outside of the form into the form with their ends being inserted upwardly into the open ends of the barrel-shaped cups a substantial distance and are held therein by fasteners. Once the concrete hardens, the fasteners are unfastened, and the tubular conduit holder, including the upright supports, the header bar, and the cups are lifted upwardly out of the concrete thereby leaving the ends of the tubular conduits near the surface of the concrete floor with their outer ends being spaced from the concrete so that one has access thereto and can couple conduits to these ends.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a side, partially cross-sectioned, view of a concrete form having a conduit-holder accessory of this invention mounted therein and one tubular conduit with a protective plastic covering sleeve thereon held in position by the conduit-holder accessory.

FIG. 2 is a cross-section taken on line 2—2 in FIG. 1;

FIG. 2A is a close-up, partially cutaway, partially cross-sectional, side view of a portion of the structure shown in FIG. 1;

FIG. 3 is a close-up of a section of one end of the tubular conduit holder accessory of FIG. 1; and, FIG. 4 is an isometric view of the end of a conduit embedded in concrete which has held in position during the hardening of the concrete by a conduit-holder accessory of this invention;

FIG. 5 is an alternate embodiment of the conduit holder accessory.

DESCRIPTION OF THE PREFERRED EMBODIMENTS

Referring now to the drawings, a conduit-holder accessory 10 basically includes a laterally extending, substantially horizontal, header bar 12, first and second upright supports 14 and 16 attached to opposite ends of the header bar 12 and cylindrically-shaped cups, or barrels, 18a–18g whose open ends are facing downwardly, and whose closed ends are attached to the bottom of the header bar 12. All members of the accessory are constructed of steel in the preferred embodiment, however, other materials could be used.

In the FIG. 1 embodiment, the first and second upright supports 14 and 16 are threaded shafts whose upper ends, as depicted in FIG. 1, are welded to bottom sides of opposite ends 20 and 22 of the header bar 12 with the aid of welded washers 23. As it can be seen in FIGS. 1 and 2, the header bar 12 is a flat narrow, long strip which is sufficiently wide to cover ends of the cups 18a–18g. The upper ends of cups 18a–18g are welded to the bottom side of the header bar 12 with the open ends 24 thereof being directed downwardly as shown in FIG. 1. With reference to FIG. 2A, a countersunk screw hole 17 is positioned in the header bar 12 approximately at the center of each cup 18a–18g for receiving a self tapping sheet metal screw 19.

In use the conduit holder accessory of this invention is attached to the floor wall 28 of a concrete form 25 having sidewalls 26. Building floors' thicknesses normally fall within a range of from four to ten inches. Thus, the conduit-holder accessory 10 of this invention has first and second upright supports 14 and 16 which are greater than 10 inches long. This conduit-holder accessory 10 is mounted as shown in FIG. 1 so that a top surface 32 of its header bar 12 is about at a concrete upper surface level 30. To accomplish this, pieces of pipe, such as plastic pipe, 34 are cut to the right length for extending from a top side 35 of the form floor wall 28 to an underside 36 of the header bar 12. The first and second upright supports 14 and 16 are then extended through these pipes 34 and lower ends 38 of the first and second upright supports 14 and 16 are extended through properly positioned holes in the floor wall 28 of the form. Nuts 40 are then screwed onto the lower ends 38 of the first and second upright supports 14 and 16 and tightened until they clamp the form floor wall 28 between the nut 40 and the pipe 34. At this point, the header bar 12 is pulled tightly against the top ends of pipes 34 so that it is held rigidly in position with its top surface approximately at the proposed concrete upper surface level 30. In this position, the cups 18a-18g are directed downwardly, with their open ends facing the downward direction. Copper end caps 39 (FIG. 2A) are soldered at 39' to the ends 42 of relatively flexible conduits 41 which are to be held by the conduit-holder accessory 10. These conduits 41 are flexibly led to the form 25 and their ends 42, with the soldered copper caps 39, are inserted into the open bottom ends 24 of the cup 18. In this regard, the cups 18a-18g are only slightly larger in diameter than the caps 39. Should a conduit 41 be made of a material which could be damaged by chemicals in the concrete, such as copper tubing being eaten by acid, a protective plastic sleeve covering 44 is placed about the conduit 41 from where the conduit 41 enters the form 25 to, and in or around, the cup 18d into which the conduit end 42 is extended. In the FIG. 1 embodiment, the sleeve covering 44 extends around, on the outside of, the cup 18d. Thus, the conduit-holder accessory 10 not only holds the conduit 41, but also holds its protective covering 44 in a correct position. While the conduit is held in this position the screw 19 is inserted through the hole 17 in the header bar 12 and engages a small pre-made hole 45 in the top of the end cap 39 in which it creates its own threads. Thus, the screw 19 is rotated to hold the header bar 12 engaged with the conduit 41 for holding it in the cup 18d.

It should be understood that the conduit-holder accessory 10 can be used to hold a plurality of conduits, one or more in each one of the cups 18a-18g, however, only one is shown in FIGS. 1 and 2 for clarity.

Once concrete has been poured to the level 30 and this concrete has been allowed to harden, machines can work the surface 30 of the concrete without interference from the conduit-holder accessory 10. Thereafter, the screws 19 can be removed and the concrete-holder accessory 10 can be knocked out of the concrete by tapping lower ends 38 of the first and second upright supports 14 and 16 to drive the conduit-holder accessory 10 upwardly, thereby pulling the cups 18a-18g, along with the header bar 12 and the first and second upright supports 14 and 16 out of the concrete. The end caps 39 are then removed from the ends of the conduits 41 by applying heat thereto to melt the solder 39' holding them thereto. The upper surface 30' of the concrete, is then as shown in FIG. 4, with the end of a conduit 42 being approximately at the surface 30' of the concrete and an open space 46 surrounding the end 42 so that couplings can be placed on the outside of the conduit end 42 from outside the wall. With regard to the open space 46, this is created by the thickness of the cup 18a-18g, the end cap 39 and whatever air is trapped in the cup 18a-18g which prevents concrete from significantly rising in the cups around the ends of the conduits. The trapping of air can be enhanced by using a rubber washer about the screw 19, however, this is not necessary.

In order to aid one in removing the conduit-holder accessory 10, in one embodiment, an attaching bar 48 is positioned on top of the header bar 12 which can be gripped by a teather, chain or the like to enable one to pull the conduit-holder accessory upwardly from above the concrete surface level 30. This attaching bar 48 does not substantially extend upwardly, so it will not interfere with the machining of the upper surface of a concrete floor.

Looking now at the FIG. 5 embodiment, this embodiment is substantially the same as the FIGS. 1 and 2 embodiment, with the exception that first and second upright supports 50 and 52 have pointed lower ends 54 and upper ends which extend slightly above a header bar 56 to form impact receiving surfaces 58. The FIG. 5 embodiment is for use in constructing a ground floor wherein ground 60 is used as the floor of a form. Thus, to put the conduit-holder accessory 62 of FIG. 5 in place the first and second upright supports 50 and 52 are pounded into the ground 60 to a position shown in FIG. 5. A chain 64 is attachable to upper ends of the upright supports 50 and 52 to aid in removing the conduit-holder accessory 62 from the ground and the concrete once the concrete hardens. It should be understood than an arrangement as is shown in FIG. 3 could also be used so that upper ends of the first and second upright supports 50 and 52 do not extend above an upper surface of the header bar 56 to interfere with concrete surface finishing machines.

In operation, the conduit-holder accessory 62 is pounded into position in the ground and a conduit, such as a copper tubing 66, is led into the form with its end being inserted in a cup 68 of the conduit-holder accessory 62. As in the case of the FIG. 1 embodiment, a plastic covering sleeve 70 is placed about the copper tubing 66 to protect it from concrete acids and fasteners, such as screws, are used to ensure that the copper tubing 66 does not fall out of or is not knocked out of the cups 68.

While the invention has been particularly shown and described with reference to a preferred embodiment, it will be understood by those skilled in the art that various changes in form and detail may be made therein without departing from the spirit and scope of the invention. For example, in the FIG. 1 embodiment, fasteners other than nuts 40 could be used for fastening to the upright supports 16. Also, the upright supports 16 do not have to pass through the floor wall 28 of the form 26 but rather could have attaching flanges at the bottoms thereof which are fastened to the upper surface 36 of the floor wall 28.

The embodiments of the invention in which an exclusive property or privilege are claimed are defined as follows:

1. A concrete-form conduit-holder accessory for holding ends of conduits in position in a concrete form having a floor form wall and side form walls during a concrete pour and, after said concrete has hardened, being removable therefrom, said conduit-holder accessory comprising:

a support means for selectively being rigidly attached to a bottom wall of said form at an attachment zone and extending from said attachment zone upwardly into said form;

a rigidly supported header bar attached to said support means and extending substantially horizontally when said support means is rigidly attached at said attachment zone; and at least one cup attached to said substantially-horizontally extending header bar, with no part thereof extending above said header bar, said cup having a substantially barrel shape with one end thereof being open and the other end being substantially closed, said cup being oriented in said form with the open end thereof being directed downwardly and the closed end thereof being directed upwardly adjacent to said header bar;

wherein said support means is external of said at least one cup;

said header bar defining an accessory top surface thereof to be placed at a concrete upper surface level with substantially all other conduit-holder structure lying vertically below said top surface and having streamlined side surfaces for allowing said conduit holder to be removed upwardly from said concrete after the concrete hardens, without damaging said concrete;

wherein a conduit to be held in position in said form during a concrete pour can be extended from outside said form into said form with its end being inserted upwardly into the open end of said at least one cup for a sufficient distance to retain said end therein during said pour while the closed end of said cup prevents said conduit from extending above said concrete, and, after said concrete has hardened about said concrete wherein said conduit holder, including said header bar said support means, and cup can be pulled from said concrete.

2. A concrete holder accessory as in claim 1, wherein there are a plurality of cups attached to said laterally-extending bar, each with an open end directed downwardly for receiving at least the end of one conduit for holding said at least one conduit in position during a pour.

3. A concrete conduit-holder accessory as in claim 2, wherein said support means comprises two upright supports whose lower ends are adapted for attaching to a support fastening means and wherein is further included tubular spacers mounted in compression between said header bar and the upper surface of a floor wall of said form, with said support means passing through said floor wall and said support fastening means being attached to said support means on the opposite side of said floor wall for said header bar and whose upper ends are attached to said header bar which extends laterally between said upright supports.

4. A concrete conduit-holder accessory as in claim 3 wherein said header bar includes a handle attachment means on an upper surface thereof for allowing a handle to be attached thereto to enable one to pull said accessory from hardened concrete from above the upper surface of said hardened concrete.

5. A concrete conduit-holder accessory as in claim 1, wherein said support means comprises two upright supports whose lower ends are adapted for attaching to a support fastening means and wherein is further included tubular spacers mounted in compression between said header bar and the upper surface of a floor wall of said form, with said support means passing through said floor wall and said support fastening means being attached to said support means on the opposite side of said floor wall form said header bar and whose upper ends are attached to said header bar which extends laterally between said upright supports.

6. A concrete conduit-holder accessory as in claim 1, wherein said header bar includes a handle attachment means on an upper surface thereof for allowing a handle to be attached thereto to enable one to pull said accessory from hardened concrete from above the upper surface of said hardened concrete.

7. A concrete conduit-holder accessory as in claim 1 wherein is further included a conduit fastening means for fastening said concrete-form conduit-holder accessory to the end of said conduit for positively holding said end in said at least one cup, but for also allowing one to unfasten said concrete-form conduit-holder accessory from the end of said conduit from above the top surface of said accessory when said concrete-form conduit-holder accessory is covered with concrete, with only said accessory top surface of said header bar being accessible from above said concrete.

8. A concrete conduit-holder accessory as in claim 7 wherein said conduit fastening means includes a cap to be attached to the end of a conduit to be held in position in said cup and an attachment means for extending through said cup and attaching to said cap for positively holding said cap in said cup.

9. A concrete conduit-holder accessory as in claim 1 wherein said header bar is a flat strip whose top and bottom surfaces are relatively flat, said top surface of said header bar forming said accessory top surface and lying approximately in the plane of a top surface of a concrete floor being poured thereabout, said cup being mounted on the bottom surface of said header bar.

* * * * *